United States Patent
Shields et al.

(10) Patent No.: US 8,971,320 B2
(45) Date of Patent: Mar. 3, 2015

(54) CONTROL LAYER FOR MULTISTAGE OPTICAL BURST SWITCHING SYSTEM AND METHOD

(75) Inventors: James Alexander Shields, Dublin (IE); John Dunne, Dublin (IE)

(73) Assignee: Intune Networks Limited, Dublin (IE)

( * ) Notice: Subject to any disclaimer, the term of this patent is extended or adjusted under 35 U.S.C. 154(b) by 45 days.

(21) Appl. No.: 13/697,163

(22) PCT Filed: May 11, 2011

(86) PCT No.: PCT/EP2011/057644
§ 371 (c)(1),
(2), (4) Date: Apr. 17, 2013

(87) PCT Pub. No.: WO2011/141524
PCT Pub. Date: Nov. 17, 2011

(65) Prior Publication Data
US 2014/0010536 A1  Jan. 9, 2014

Related U.S. Application Data

(60) Provisional application No. 61/333,373, filed on May 11, 2010.

(30) Foreign Application Priority Data

May 11, 2010  (EP) .................................... 10162531

(51) Int. Cl.
*H04L 12/28* (2006.01)
*H04J 14/02* (2006.01)
(Continued)

(52) U.S. Cl.
CPC ............ *H04J 14/0227* (2013.01); *H04L 45/04* (2013.01); *H04Q 11/0066* (2013.01);
(Continued)

(58) Field of Classification Search
None
See application file for complete search history.

(56) References Cited

U.S. PATENT DOCUMENTS

2002/0109878 A1 * 8/2002 Qiao ............................. 359/118
2002/0109879 A1 * 8/2002 Wing So ....................... 359/118
(Continued)

FOREIGN PATENT DOCUMENTS

WO  WO2005034569  4/2005
WO  WO2005062578  7/2005

OTHER PUBLICATIONS

Xin Liu et al: "Resilient burst ring: extend IEEE 802.17 to WDM networks" IEEE Communications Magazine, IEEE Service Center, Piscataway, US., vol. 46, No. 11, pp. 74-81, XP011239037, figures 1, 2, 3.

(Continued)

*Primary Examiner* — Clemence Han
(74) *Attorney, Agent, or Firm* — Occhiuti & Rohlicek LLP (57) ABSTRACT

The invention provides a control layer for an Optical Burst Switch (OBS) system, said system comprising at least one stage configured with a closed optical burst switch addressing scheme and one or more ports for sending or receiving data packets. The control layer comprises a control addressing scheme independent of the closed optical addressing scheme and means to provide interconnectivity for each port with every other port. In one embodiment there is provided a closed optical burst switch ring network. The control layer encapsulates or maps the optical data at a port into an independent packet format and passes the independent packet format into a queuing system for transmission by the optical burst switch ring network to a destination port.

16 Claims, 3 Drawing Sheets

(51) Int. Cl.
*H04L 12/715* (2013.01)
*H04Q 11/00* (2006.01)
*G06F 15/173* (2006.01)
*H04J 14/00* (2006.01)

(52) U.S. Cl.
CPC ............... *H04Q2011/0064* (2013.01); *H04Q 2011/0073* (2013.01); *H04Q 2011/0092* (2013.01); *H04Q 2011/0098* (2013.01)
USPC ............................ 370/389; 709/238; 398/45

(56) References Cited

U.S. PATENT DOCUMENTS

| | | | |
|---|---|---|---|
| 2003/0061376 A1* | 3/2003 | Li et al. | 709/238 |
| 2003/0067919 A1* | 4/2003 | Qiao et al. | 370/392 |
| 2003/0091043 A1* | 5/2003 | Mehrotra et al. | 370/389 |
| 2004/0153570 A1* | 8/2004 | Shobatake | 709/238 |
| 2005/0013613 A1* | 1/2005 | Stevenson et al. | 398/60 |
| 2007/0212065 A1* | 9/2007 | Shin et al. | 398/45 |
| 2009/0080885 A1* | 3/2009 | Mehrotra et al. | 398/48 |

OTHER PUBLICATIONS

Gang Wang et al: "Wavelength Tunable Optical Burst Ring Network Test-Bed and Experimental Research", Communication and Networking in China, 2007. Chinacom'07. Second International Conference on, IEEE, Piscataway, NJ, USA, Aug. 22, 2007, pp. 489-492, XP031237927; ISBN: 978-1-4244-1008-8, figure 2.

Chunming Qiao: Labeled Optical Burst Switching for IP-Over-WDM Integration; IEEE Communication Magazine, IEEE Service Center, Piscataway, US, vol. 38, No. 9, Sep. 1, 2000. pp. 104-114, XP011091349, figure 4.

\* cited by examiner

-PRIOR ART-

CONTROL LAYER FOR MULTISTAGE OPTICAL BURST SWITCHING SYSTEM AND METHOD

CROSS-REFERENCE TO RELATED APPLICATIONS

This application is the National Stage of International Application No. PCT/EP2011/057644, filed on May 11, 2011, which claims the priority of U.S. Application No. 61/333,373, filed on May 11, 2010 and EP Application No. 10162531.7, filed on May 11, 2010. The contents of these applications are hereby incorporated by reference in their entirety.

FIELD OF THE INVENTION

This invention describes a method and system for construction of a large capacity packet switch architecture based on distributed burst optical switches. In particular the invention relates to a control layer for a switch architecture that allows interconnections between optical burst switch closed ring networks.

BACKGROUND TO THE INVENTION

Optical burst switching can be used in either an unbounded optical medium format or a bounded optical medium format. An unbounded optical medium is one where an arbitrarily mesh interconnected set of optical cross connects provide a fibre transmission path infrastructure through which optical bursts are propagated between sources and destinations distributed throughout the mesh.

In a bounded optical medium format, the optical transmission infrastructure is closed to provide a constrained transmission path, normally a fibre ring, across which direct connectivity is possible between sources and destinations with no intermediate optical cross connection being required. In the former unbounded case optical bursts must be routed through the mesh of optical paths, and scheduled to ensure bursts do not collide at any point in the network. In the latter bounded case bursts need only be scheduled, as the route is a straight propagation along a single transmission medium shared between all sources and all destinations.

This invention is concerned with the bounded optical burst switching system format. In this a series of source destination pairs are provided access to drop and insert optical bursts from and to a shared optical transmission medium. An example of this is provided by connecting a set of optical burst source destination pairs together using a single continuous fibre ring with tap points providing the drop and insert points for each pair. This arrangement provides a means by which any source may transmit to any destination. Each source must precisely time its burst transmission at each optical channel to ensure it will not interfere or collide with any source attempting to transmit on the same optical channel. The optical channels are defined by the wavelength used for optical transmission. Scheduling is used to ensure no collisions take place and to ensure that each source on the system has fair access through the optical transmission medium to each destination, and that each destination is given fair connectivity through the optical transmission medium to each source.

The system also provides a means by which incoming service flows are queued then transmitted across the medium each to its respective destination. Multiplexed service flows may be presented at a source, so the service management aspect of the system de multiplexes these and then multiplexes them into queues for transmission to the correct destination. The scheduling system removes the service queued information and transmits this in burst format across the medium to its destination port on the system.

When the incoming service flows are ethernet, the optical burst switch system provides a distributed ethernet switch. With legacy ethernet switching technology a network is created by interconnecting ethernet switches using optical transport technology. Here the switching nodes provide some client ports while other ports are reserved for interconnecting switching nodes. A problem with this arrangement is that the network owner must separately engineer the switching layer of the network from the transport layer of the network. The distributed ethernet switch overcomes this by using the optical burst switching layer as both a transport layer and switching fabric. This simplification provides a carrier with frame level direct optical forwarding between the ports around the closed fibre medium. The number of switching stages are also minimised using such a distributed switch system, which reduces the inherent latency through the network and simplifies the control plane over head required to provision and manage flows through the network.

However a drawback of the optical burst switching based distributed switch is that the burst medium is closed and therefore inherently limited in capacity. The capacity of the system is set by the transmission bit rate of the optical source modulator and the number of optical channels that can be supported. For example a 10 Gb/s optical line rate with 80 possible active wavelengths will nominally scale to 800 Gb/s. The nominal capacity is not completely achievable as the optical burst switching system with real time scheduling will exhibit a fabric efficiency of around 83%. Higher scaled networks can be created by interconnecting distributed ethernet switches over fixed optical connections, but while this reduces the number of switching stages in comparison with legacy switches interconnected by fixed optical lines, it still carries the burden of control plane management and multiple hops for individual frames.

Ultimately therefore the distributed ethernet switch built from an optical burst switching system is limited in scale by the fact that bursts cannot extend outside the closed optical medium. Unbounded optical burst switching systems are able to scale too much larger theoretical limits, but are difficult to build commercially. While the bounded optical burst system is practically viable, it has limitations in scale set by the spectral efficiency possible over the closed medium.

PCT patent publication number WO2005034569A2, assigned to Intel Corporation, discloses an optical switched network using extended Border Gateway Protocol (BGP). The PCT patent publication describes a modification to the Border Gateway Protocol (BGP) in order to allow IP routing header information from within an Optical Burst Switching (OBS), referred to therein as a Photonic Burst Switched (PBS) open network, to be used to route traffic through open OBS network zones in conjunction with other routing zones such a enterprise LAN and WAN networks. To do this the IP header information is taken from the traffic path at the border between two OBS zones, or an OBS zone and a non OBS zone, and the routing protocol is used to determine where to send the traffic in each zone accordingly. The system allows for the creation of extensions to BGP that allow traffic to be routed between PBS (OBS) fabrics. However a problem with this system is that it is restricted to IP addressing and cannot route data from multiple service providers on the same network.

A second PCT publication number WO2005/062578, assigned to Intel Corporation, discloses an architecture for optical networking between server and storage area networks. This system attempts to encapsulate fibre channel frames into one or more OBS data bursts. To create a networking solution with this, the routing protocols must use the fibre channel addresses, or the PBS addresses to provide routes through the group of PBS and non PBS fabrics. The control plane for such a group of fabrics must therefore be service specific, in this case fibre channel, but in the general case comprised of the addressing scheme of the client service, or PBS (OBS) specific, where the OBS system is therefore pre-connected to provide a transport server for the client service network.

It is an object of the invention to provide an optical burst switching system and method of scaling beyond the limitation set by the optical channel density and the optical line rate within the closed optical layer.

SUMMARY OF THE INVENTION

According to the invention there is provided, as set out in the appended claims, a control layer for an Optical Burst Switch (OBS) system, said system comprising at least one stage configured with a closed optical burst switch addressing scheme and one or more ports for sending data packets; and said control layer comprises a control addressing scheme independent of the closed optical addressing scheme and means to provide interconnectivity for each port with every other port.

In one embodiment there is provided a control layer for an Optical Burst Switch (OBS) system, said OBS system comprising at least one stage, each stage configured with a closed optical burst switch addressing scheme and one or more ports, each port adapted for sending or receiving client data, one or more of said ports adapted to support a plurality of client service formats, representative of different client data services; characterised in that:

said control layer comprises a control addressing scheme independent of the closed optical addressing scheme by means of encapsulating client data at a port into a packet format, independent of the optical addressing scheme, to provide a control address, and passing the encapsulated packet format into a queuing system for onward transmission to a destination port; and means to provide interconnectivity for each port with every other port in said stage.

The flow control layer provides a common distributed switch infrastructure which can be used for more than one client service format. By encapsulating or mapping the data into an independent packet format the optical ring network can transmit and receive data from a multitude of different sources and service providers, for example SDH, Ethernet and IP. The switch can essentially provide an electrical representation of the optical data that can be used to route to the appropriate destination node from information in the independent packet data. In other words the packet format is packaged in such a way is that it is Client service independent.

The invention provides an overlay control plane to the OBS fabric. This overlay comprises an encapsulation of the client traffic which is allocated its own address that is specific to the group of OBS fabrics that are being controlled. This group is a closed group. Prior art systems use the IP headers of the client traffic and utilise Border Gateway Protocols (BGP), such that the extensions only operate on IP addresses. The invention provides a layer of addressing between the burst addressing scheme, which is inherently bound to the wavelength address, and the client address scheme and does not rely on the IP address. This new layer provides client address independence and allows the closed group of OBS fabrics to be multiservice. A second aspect of the present invention which differs fundamentally from the prior art is that the closed group of OBS fabrics are topologically static and bounded. This means that routing, by which is meant the calculation of a route through the multiple fabrics, using a protocol such as BGP is unnecessary. This is because the closed group of OBS fabrics have pre-ordained routes between end point addresses of the new defined encapsulation layer determined by the connection topology at the system build. This gross simplification allows the construction of multistage OBS fabrics that are seen by the client services as single switches. This is much different to the use of an extended BGP to allow the routing of IP flows through multiple OBS fabrics to form an open network.

The encapsulation allows for the creation of a closed network with gross simplification over the use of BGP in an open network. Moreover the encapsulation does not need to distinguish what type of optical data is been encapsulated such that the control layer can handle data from multiple client services. In other words, the invention encapsulates the FC packet in OPST (Optical Packet Switch and Transport), then encapsulates the OPST in the OBS frame. This provides a new layer between OBS and the client packet, combined with the closed OBS fabric group.

In one embodiment the system comprises at least three or more stages, wherein each stage comprises a closed optical addressing scheme and one or more ports to provide a multi-stage switch; and said control layer spans the multi-stage switch, such that the independent control scheme provides interconnectivity for each port with every other port.

In one embodiment the control layer comprises means for encapsulating optical data at a port into an independent packet format to provide an independent control address and passing the independent packet format into a queuing system for onward transmission to a destination port.

In one embodiment said encapsulating packages the optical data as an electrical representation data frame comprising optical layer addresses.

In one embodiment the optical layer address comprises a destination port address.

In one embodiment the independent control addresses comprises a digital control frame packet.

In one embodiment the independent control addresses comprises a header frame for storing the optical address of a destination port.

In one embodiment the header frame comprises or contains an address which indicates which ring and wavelength the destination port belongs to.

In one embodiment there is provided a scheduler with means to detect the presence of a user data in a queue and schedule transmission bursts to remove the data from the queue.

In one embodiment the scheduler comprises means to stream from a queue and transmit across the optical burst network, such that the flow control layer provides a data plane vehicle and a control plane demand to enable a complete abstraction of the burst optical data.

In one embodiment the control layer comprises an abstracted external interface which has a digital electrical data plane aspect and a digital electrical control plane aspect.

In one embodiment the switch comprises at least one port on a closed optical burst distributed switch reserved for external client ports.

In one embodiment there is provided means to provide flow continuity from edge through core to edge of the switch while the optical burst transmission is contained within each closed optical system at each stage.

In one embodiment the control layer is positioned in at least one port in a stage allows for the creation of a multistage distributed switch system using the control layer for interconnection of the stages.

In one embodiment an overlay flow control layer is realised by placing a control processor at the intersection between an edge stage and a core stage of the multistage distributed switch system.

In another embodiment there is provided a control switch for use in a closed optical burst switch ring network, said switch comprising a control layer for encapsulating optical data at a port into an independent packet format and passing the independent packet format into a queuing system for transmission by the optical burst switch ring network to a destination port.

In a further embodiment of the present invention there is provided a method of controlling an Optical Burst Switch (OBS) system, said OBS system configured with a closed optical burst switch addressing scheme and one or more ports, each port adapted for sending or receiving client data, one or more of said ports adapted to support a plurality of client service formats, representative of different client data services; said method comprising the steps of:

implementing a control addressing scheme independent of the closed optical addressing scheme by encapsulating client data at a port into a packet format, independent of the optical addressing scheme, to provide a control address, and passing the encapsulated packet format into a queuing system;

transmitting the encapsulated packet format to a destination port.

There is also provided a computer program comprising program instructions for causing a computer program to carry out the above method which may be embodied on a record medium, carrier signal or read-only memory.

BRIEF DESCRIPTION OF THE DRAWINGS

The invention will be more clearly understood from the following description of an embodiment thereof, given by way of example only, with reference to the accompanying drawings, in which.

DETAILED DESCRIPTION OF THE DRAWINGS

Figure 1:
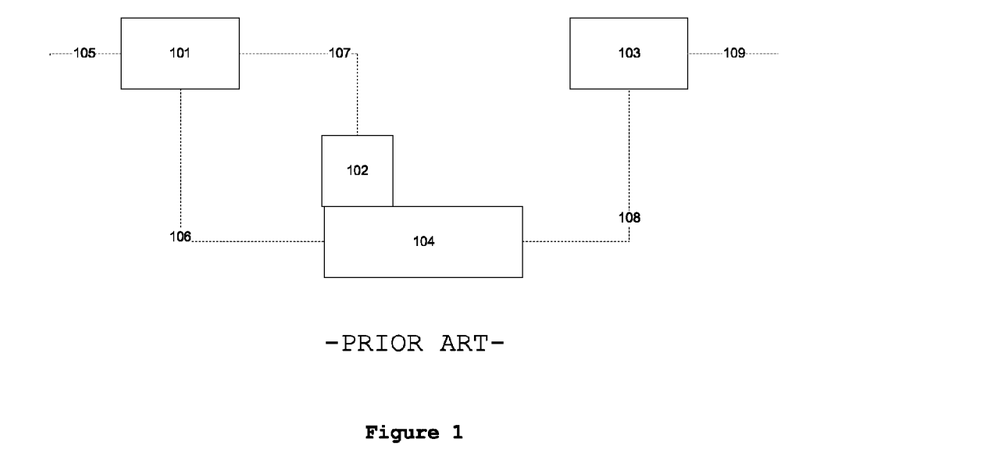
FIG. 1 illustrates a prior art implementation of an optical network.

FIG. 1 depicts prior art implementation of an optical network in an optical burst switch (OBS) system having a plurality of ports or nodes. For clarity only one direction of forwarding through the system has been shown. The service flow enters a system through interface 105. The service is processed by a traffic classification function 101. This extracts component flows from the port flow and sends these to the correct queue in the Optical Burst Switching function 104. An example of a service flow traffic managed into component flows would be, but would not be limited to an Ethernet service comprising a number of tagged flows making up an Ethernet virtual private line service.

The traffic classification function, 101, would in this case read the tag and direct the packet to its respective queue on a packet by packet basis. The optical burst switching function has a queue for each destination node on the OBS system. The traffic classification function, 101, can be pre-configured to map component traffic flows from an incoming port flow to the correct destination specific queue in the OBS function 104. This pre-configuration may be carried out manually, or it may be carried out from an automated control system operating across the entire network. Typical network control systems would be, but would not be limited to, PNNI, MPLS, ASON, GMPLS or IS-IS. The extracted flows are placed in native form into their destination node queues over the interface 106. The traffic classification function 101 also configures a scheduler 102 so that the flow characteristics required by each component flow able to be provided by the OBS network 104. At the egress end of the system, an egress traffic management function 103 assembles a single egress flow from the component flows arriving from the OBS source nodes around the OBS network over interface 108. The aggregated service flow then egresses the system through interface 109.

Figure 2:
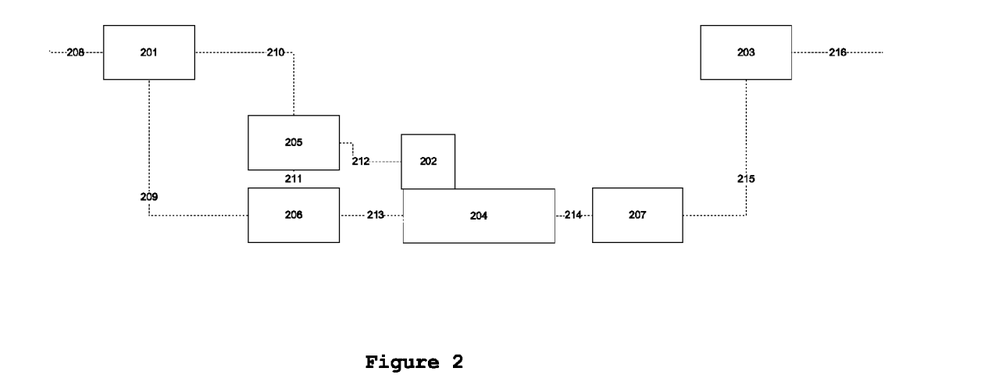
FIG. 2 illustrates a system with a control layer according to the present invention.

FIG. 2 illustrates a system with a control layer according to the present invention. The control layer sits above an OBS layer and under the service layer. The service enters the system through interface 208. A traffic management function 201 extracts the component flows as described in FIG. 1, but in addition passes these flows into a control layer encapsulation function 206. This control layer encapsulates quanta of service flow data to provide a common internal frame format for the OBS network and queuing system 204 to handle.

A property of the encapsulation function 206 is that it can take many service component flows and aggregate them into a single flow between ingress nodes of the OBS system and egress nodes of the OBS system. This property of aggregation bounds the internal address capacity to that needed for internal control of flows between the nodes of the system as opposed the service address capacity which is typically much larger. The traffic management function 201 uses an interface 210 to provide flow parameters to a control layer forwarding function 205. The control layer function 205 creates internal addresses for each aggregate flow and attaches these to encapsulation frame headers using interface 211.

The interface 210 is provided to the traffic management function 201. This means that the flow requirements may be specified using this set of parameters instead of programming a scheduler 202 directly. The parameters used to describe the flow are typically, but not limited to the following: Committed information rate, peak information rate, committed burst size and required delay bound.

The control layer forwarding function 205 then uses these parameters to algorithmically determine the required scheduler and queue management parameters for the particular instance of scheduler and queue management operating on the system at the time. This algorithmic determination of the scheduler and queuing parameters allows the system to operate for different services through a common flow characteristic definition interface, and on the other allow the system scheduler to be modified for enhanced performance without the service interface needing to change. The only alteration required in the latter case is to upgrade the algorithm which derives the scheduler parameters from the service requirement input.

The algorithm is able to determine the change in queuing and scheduler parameters in response to a client flow being added or deleted from an aggregate of client flows operating as a single internal flow with common encapsulation headers. This is in addition to being able to determine the queuing and scheduling parameters needed to create a new internal flow. The queuing and scheduling parameters are programmed into the OBS network layer over interface 212. The encapsulation headers attached to the service flows in function 206 also are given data used to instrument the internal flows so that any errors in transmission across the system may be detected. Error detection instrument examples are typically, but not limited to bit errors, block errors, packets lost, packets out of sequence, and packets discarded.

The encapsulation function 206 sends each aggregate flow into the queue for its corresponding destination through interface 213. The OBS network then transmits bursts of data from each queue to each destination as scheduled by the scheduler 202.

At the egress interface 204 from the OBS network, each incoming internal flow aggregate has the internal encapsulation removed in function 207. This function examines the header instrumentation data and provides alarm and performance information about the internal forwarding integrity relative to the flow characteristics required by the source forwarding functions 205. Many source forwarding functions 205 can be transmitting to each destination forwarding function 207. The destination forwarding function merges all of these component flows into a single flow and removes the internal encapsulation. This provides a single flow for the egress traffic management function 203 to process over the interface 215. The traffic then egresses the system through interface 216.

Figure 3:
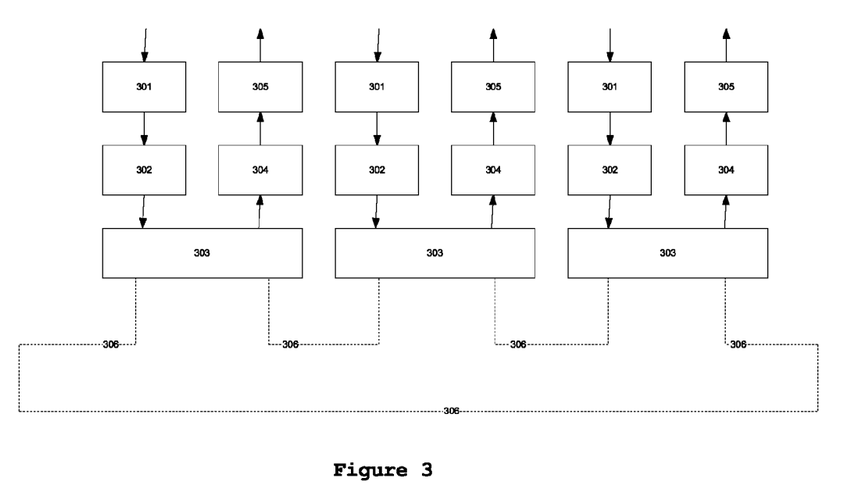
FIG. 3 illustrates a system with the control layer shown in FIG. 2 implemented in a distributed manner.

FIG. 3 illustrates a system with the control layer shown in FIG. 2 implemented in a distributed manner. There are three instances of the system shown connected to a closed optical medium represented by fibre interfaces 306. The traffic classification function is 301. Functions 205 and 206 are shown in a single function here, 302 and the optical burst transmitter, scheduler and receiver are shown in function 303. The receive and transmit paths of each port or node of the system are shown. The receive path comprises de-encapsulation from the control later in function 304 into the traffic forwarding function 305. In this embodiment a control channel is provided to permit the instances of the control layer to communicate. Instances of the traffic classification and forwarding layer may also separately communicate. This communication is often referred to as peering. In this embodiment, the control layer functions 302 and 304 peer together in order to establish flows of control packets between the ports in either unidirectional or bi-directional form. The traffic classification functions constitute another peered layer.

In the traffic peered layer the functions 301 and 305 peer together to establish the intent to create a service flow between the ports. They then request a control flow and mapping from the control layer embodied in 302 and 304 which establish the connectivity with flow characteristics needed to provide the service.

Figure 4:
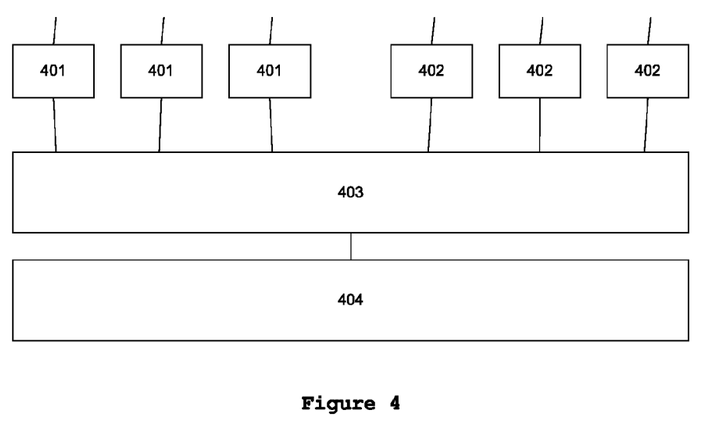
FIG. 4 illustrates an abstracted form of the distributed system according to one aspect of the invention.

In FIG. 4 illustrates an abstracted form of the distributed system is shown. The control layer comprises peered instances of control functions that can be summarised in a system wide function 403. This is connected through a scheduling function to the burst transmission system 404. The traffic classification functions are shown in their individual instance form in two groups. The two groups are shown in the functions 401 and 402. This embodiment illustrates the common control plane inserted between the traffic classification layer and the optical burst layer used to provide a multi-service system. In one embodiment the service 401 may be Ethernet, where the control layer provides flows that are used to create Ethernet virtual connections (EVCs) between the end ports on the nodes of the system.

At the same time the traffic classification functions 402 may be SDH or Sonet, where the control layer provides flows that are used to create VC4 or STS1 connections between the end ports on the nodes of the system. In this embodiment the optical burst switching resources needed to provide the connectivity between the groups of service classification functions are grouped together under these functions, 401 and 402 by the control layer. Thus creating connections between the group of traffic classification functions 401 has no effect on the group of traffic classification functions 402. In another embodiment of this system, the group of traffic classification functions 401 is of the same service type as the group of traffic classification functions 402. An example is that the two groups of functions 401 and 402 are Ethernet. With this embodiment the group 401 is administered separately to the group 402. The common control function 403 allows the network operator to add and subtract nodal functions separately to each service group. The separate administrations may then use their service group without interfering with the other administration. There may be many more traffic classification groups than 2. The service types used in this description are Ethernet and Sonet or SDH. There may be more service types for example, but not limited to MPLS, IP, Fibre Channel and ESCON.

Figure 5:
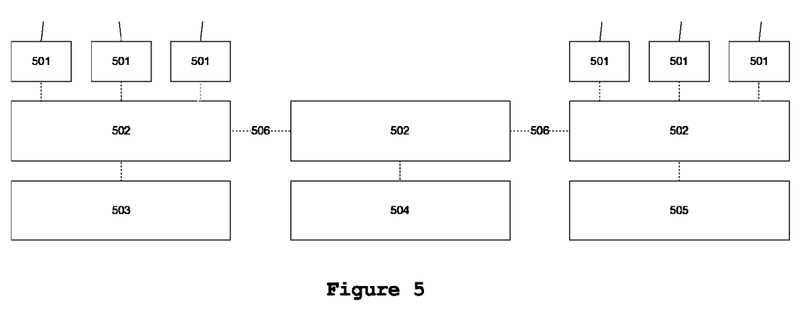
FIG. 5 illustrates a schematic of how the control layer is used to expand a distributed Optical Burst switch system into a multi stage optical burst switch system.

FIG. 5 illustrates a schematic of how the control layer is used to expand a distributed Optical Burst Switch (OBS) system into a multi stage optical burst switch system. There are three closed optical burst switching network stages, 503, 504 and 505. Each OBS network has a closed optical address space.

A control layer 502 has a common address space across all three OBS networks. In this embodiment, there are two edge stages and a central interconnecting stage. The interconnecting stage is not provided with any traffic classification ports and is therefore used for interconnections between the edge systems. The control layer 502 on each stage in this embodiment is comprised of a series of peered instances of the control functions as previously described. This group of instances is connected to the interconnecting system control layer through interface 506. This interface 506 is taken from the output of the control system before the de-encapsulation function so that there is packet continuity in the control layer from the encapsulation at the edge of the first stage to de-encapsulation prior to traffic forwarding in the final stage in the traffic function 501. Interface 506 also includes the control information to permit the connecting stage system to provision the scheduler to provide the flow characteristics needed by the service.

Figure 6:
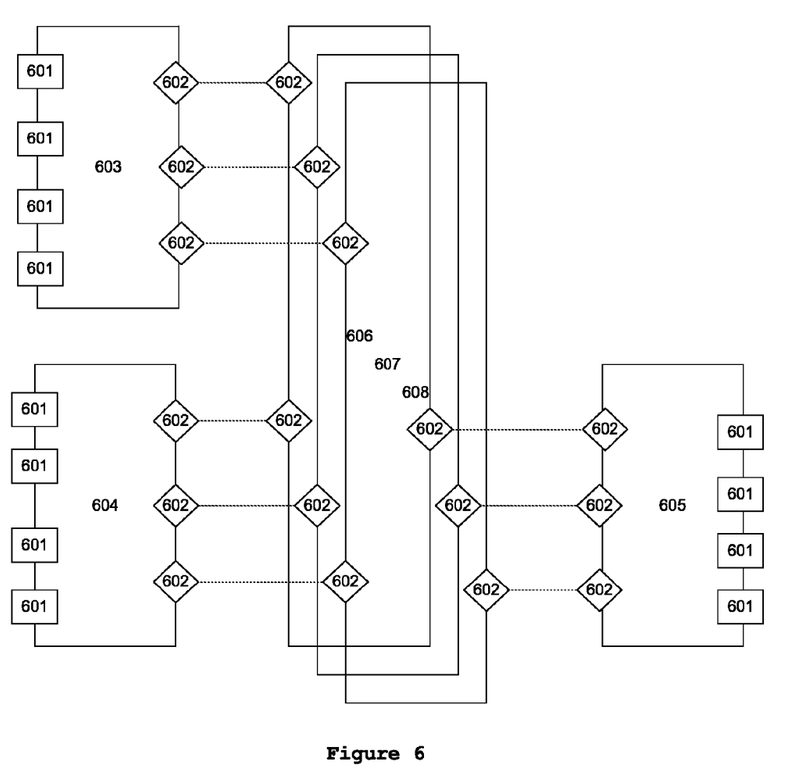
FIG. 6 shows an arrangement of OBS stages connected to form a three stage switch according to one embodiment of the present invention.

FIG. 6 shows an arrangement of OBS stages connected to form a three stage switch according to one embodiment of the present invention. The control layer interconnection between the rings is indicated by a diamond symbol 602. Each stage of this embodiment can be identical and comprises the closed optical burst switching network, the control layer and at least one set of traffic management functions. There are three edge systems shown, 603, 604 and 605. There are three core systems shown, 606, 607 and 608. The core systems and edge systems differ only in that the core systems do not provide traffic classification functions and client interfaces 601. In this embodiment, the control layers at each edge communicate with one another through a control channel (not shown).

A suitable control channel can be provided by an IP or Ethernet network connected between the control function at each edge of the three stage system. To establish a connection from a port on one edge system to a port on another edge system, the two edge systems peer and select which core system to place the connection through. The core system control function communicates with the edge systems in a similar manner using the same control channel. A selection criterion for deciding on which core ring to select for connecting the system would be, but would not be limited to, the available capacity in the core system for connecting the two edge systems requesting interconnection. For example, if a connection were required between a client port 601 on edge system 603 to a client port 601 on edge system 605, the edge system 603 control layer instance would contact the edge system 605 control layer instance to signal the intent to set up a connection. There are three available interconnection control ports through which the connection can be made. The edge system 605 will return the available ports for the connection. The edge system 603 will then correlate these with the ports it has available for the connection and select the core system or systems which are available for making the connection. The first available core system control instance will be contacted over the control channel to request connection. If rejected this process will be repeated until a core system is found which will accept the connection, or the connection will be rejected.

It will be appreciated that optical burst switching systems operating over a bounded optical medium such as a fibre optic ring, can be used to provide a fabric for distributed ethernet switches.

In other embodiments the optical burst switching fabric could be used to create a distributed MPLS switch, or a distributed IP router. In such arrangements each port of the distributed switch is provided with the client service processing silicon and protocols that forward incoming client packets into queues that are emptied by transmission across the optical burst fabric. In such arrangements the optical burst switching system is either directly controlled by the client service, is statically provisioned to meet the needs of the client service, or some combination of both.

The invention provides a layer of flow control provided by an independent packet format and queuing system completely bound to the optical burst transmission fabric. This layer provides external control interfaces which allow the client service to place flow demands, which are then executed by the optical burst transmission fabric. The external interfaces will only accept flow demands that are within the capabilities of the optical burst transmission fabric to meet. In this way the flow control layer is bound directly to the optical burst fabric, but it effectively hides the characteristics of the fabric technology from the client services using the fabric.

The flow control layer has a data plane aspect which provides a means by which a client service can be encapsulated using digital electronic technology and passed into a queue for transmission by the optical burst system. The scheduling system reacts to the presence of the flow control data in the queue by scheduling bursts to remove the data from the queue. In addition to responding to the presence of flow control data, the scheduler, at the same time, responds to flow demand provisions. These are limits placed on the scheduler that exactly correspond to the maximum amount of information that the scheduler is permitted to stream from a queue and transmit across the optical burst medium. The flow control layer therefore provides a data plane vehicle and a control plane demand that provide a complete abstraction of the burst optical medium.

The abstraction of the optical burst medium provided by the flow control layer provides a means by which the optical burst switch can controlled to deterministically execute flow demands by forwarding sufficient optical bursts to meet the demands when flow control encapsulated packets are present in the queues. In this way the closed optical burst layer of the system is provided with an abstracted external interface which has a digital electrical data plane aspect and a digital electrical control plane aspect.

The flow control layer provides a common distributed switch infrastructure which can be used for more than one client service format. This allows an optical burst switch infrastructure to be created that can be used as a host platform for multiple client service virtual switches to simultaneously operate.

In another embodiment the flow control layer provides a single closed optical burst switch system with a generalised abstracted set of control plane and data plane port interfaces that completely encapsulate the closed optical internal fabric. By reserving some of these interfaces for interconnection of identical closed optical burst systems a multistage optical burst switch is realised. With this type of embodiment some ports on a closed optical burst distributed switch are reserved for external client ports and some ports are reserved for interconnecting stages. An example of a multistage switch would be where up to half of the port interfaces were reserved for interconnection at the edge stages of the multistage switch while all of the ports of the core stages are reserved for interconnections. The flow control layer here provides flow continuity from edge through core to edge while the optical burst transmission is contained within each closed optical system at each stage. The flow control layer here provides a means by which the closed optical burst fabric can be scaled to multistage switch arrangement by transforming flows from client format, to flow control layer format, to optical burst format, to flow control layer format and using this format to provide the means by which to interconnect the stages of the multistage distributed switch.

The control system positioned in at least one node in the network allows for the creation of a multistage distributed switch system using the flow control layer for interconnection of the stages increases the switching capacity from the limits of a single stage system without incurring the complexity of route calculation through multiple independent distributed switch systems interconnected through client ports. This is because the flow control layer interconnections are constrained to defined topologies such that a flow entering the system at an ingress edge stage may reach any egress edge through any of the interconnecting flow layer ports. Here the problem of determining which of the interconnecting ports to use is one of load balancing the flows across available port resources rather than establishing a route by signalling across multiple independent distributed switch systems.

The control system allows the flow control from a single stage distributed closed optical burst switch to a multistage distributed optical burst switch is realised by the addition of an overlay flow control layer. This overlay flow control layer is realised by placing a control processor at the intersection between an edge stage and a core stage of the multistage system. The controllers within each stage work as clients of the intersection controller. The intersection controllers peer with each other to provide an overlay to the controllers within each stage.

The embodiments in the invention described with reference to the drawings comprise a computer apparatus and/or processes performed in a computer apparatus. However, the invention also extends to computer programs, particularly computer programs stored on or in a carrier adapted to bring the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a floppy disk or hard disk. The carrier may be an electrical or optical signal which may be transmitted via an electrical or an optical cable or by radio or other means.

In the specification the terms "comprise, comprises, comprised and comprising" or any variation thereof and the terms include, includes, included and including" or any variation thereof are considered to be totally interchangeable and they should all be afforded the widest possible interpretation and vice versa. The invention is not limited to the embodiments hereinbefore described but may be varied in both construction and detail.

The invention claimed is:

1. A method of controlling an Optical Burst Switch (OBS) system, said OBS system comprising at least one stage, each stage configured with a closed optical burst switch addressing scheme and one or more ports, each port adapted for sending or receiving optical client data, one or more of said ports adapted to support a plurality of client service formats, representative of different client data services;

implementing a control addressing scheme independent of the closed optical burst switch addressing scheme by encapsulating the optical client data at a port into a packet format, independent of the closed optical burst switch addressing scheme, to provide a control address, and passing the encapsulated packet format into a queuing system for onward transmission to a destination port; and providing interconnectivity for each port with every other port in said at least one stage.

2. The method as claimed in claim 1, wherein said system comprising at least three or more stages, wherein each stage comprises a separate closed optical burst switch addressing scheme and one or more ports to provide a multi-stage switch; and wherein said controlling spans the multi-stage switch, such that an independent control scheme provides interconnectivity for each port with every other port.

3. The method as claimed in claim 1 wherein said encapsulating packages the optical client data as an electrical representation data frame comprising optical layer addresses.

4. The method as claimed in claim 3 wherein the optical layer address comprises a destination port address.

5. The method as claimed in claim 1 wherein the control addressing scheme comprises a digital control frame packet.

6. The method as claimed in claim 1 wherein the control addressing scheme comprises a header frame storing an optical address of a destination port.

7. The method as claimed in claim 1 wherein the control addressing scheme comprises a header frame storing an optical address of a destination port and the header frame comprises a wavelength colour to indicate which network ring the destination port belongs to.

8. The method as claimed in claim 1 wherein a data packet format is tightly bound to an optical burst transmission fabric.

9. The method as claimed in claim 1, further comprising detecting a presence of a flow control data in a queue and to schedule transmission bursts to remove the flow control data from the queue.

10. The method as claimed in claim 1, further comprising detecting a presence of a flow control data in a queue and to schedule transmission bursts to remove the flow control data from the queue and wherein the scheduler comprises means to stream from a queue and transmitting across an optical burst network, such that a flow control layer provides a data plane vehicle and a control plane demand to enable a complete abstraction of burst optical data.

11. The method as claimed in claim 1 wherein the method provides an abstracted external interface which has a digital electrical data plane aspect and a digital electrical control plane aspect.

12. The method as claimed in claim 1 wherein the closed optical burst switch comprises at least one port on a closed optical burst distributed switch reserved for external client ports.

13. The method as claimed in claim 1 further comprising providing flow continuity from edge through core to edge of the closed optical burst switch while an optical burst transmission is contained within each closed optical system at each stage.

14. The method as claimed claim 1 wherein the method controls at least one port in a stage allows for creation of a multistage distributed switch system using the control layer for interconnection of the stages.

15. The method as claimed in claim 1 wherein the method controls at least one port in a stage allows for creation of a multistage distributed switch system using the control layer for interconnection of the stages and an overlay flow control is realised by placing a control processor at an intersection between an edge stage and a core stage of the multistage distributed switch system.

16. A computer program stored in non-transitory computer readable medium comprising program instructions for causing a computer to perform the method of claim 1.

* * * * *